(12) United States Patent
Liu et al.

(10) Patent No.: US 12,150,468 B2
(45) Date of Patent: Nov. 26, 2024

(54) INTELLIGENT SEPARATION DEVICE AND SEPARATION METHOD FOR PEANUT KERNEL AND PEANUT RED COAT

(71) Applicants: QINGDAO UNIVERSITY OF TECHNOLOGY, Shandong (CN); HENAN UNIVERSITY OF SCIENCE AND TECHNOLOGY, Henan (CN); RESEARCH INSTITUTE OF AGRICULTURAL MECHANIZATION, XINJIANG ACADEMY OF AGRICULTURAL SCIENCES, Xinjiang (CN)

(72) Inventors: Mingzheng Liu, Qingdao (CN); Changhe Li, Qingdao (CN); Xinping Li, Qingdao (CN); Xiangdong Liu, Qingdao (CN); Huimin Yang, Qingdao (CN); Yanbin Zhang, Qingdao (CN); Xiaoming Wang, Qingdao (CN); Yali Hou, Qingdao (CN)

(73) Assignees: QINGDAO UNIVERSITY OF TECHNOLOGY, Shandong (CN); HENAN UNIVERSITY OF SCIENCE AND TECHNOLOGY, Henan (CN); RESEARCH INSTITUTE OF AGRICULTURAL MECHANIZATION, XINJIANG ACADEMY OF AGRICULTURAL SCIENCES, Xinjiang (CN)

( * ) Notice: Subject to any disclaimer, the term of this patent is extended or adjusted under 35 U.S.C. 154(b) by 503 days.

(21) Appl. No.: 17/442,515

(22) PCT Filed: May 8, 2020

(86) PCT No.: PCT/CN2020/089274
§ 371 (c)(1),
(2) Date: Sep. 23, 2021

(87) PCT Pub. No.: WO2021/208160
PCT Pub. Date: Oct. 21, 2021

(65) Prior Publication Data
US 2022/0225655 A1  Jul. 21, 2022

(30) Foreign Application Priority Data

Apr. 13, 2020 (CN) .......................... 202010287365.2

(51) Int. Cl.
*A23N 5/08* (2006.01)
*A23N 5/00* (2006.01)
(Continued)

(52) U.S. Cl.
CPC ........... *A23N 12/083* (2013.01); *A23N 5/002* (2013.01); *A23N 5/01* (2013.01); *A23N 5/08* (2013.01)

(58) Field of Classification Search
CPC ... A23N 5/01; A23N 5/00; A23N 5/08; A23N 5/002
(Continued)

(56) References Cited

U.S. PATENT DOCUMENTS

| | | | | |
|---|---|---|---|---|
| 1,187,702 A | * | 6/1916 | Boss | B02C 18/0092 241/68 |
| 2,806,501 A | * | 9/1957 | Dijk | A23N 5/004 426/507 |

(Continued)

FOREIGN PATENT DOCUMENTS

| | | |
|---|---|---|
| CN | 85103396 A | 10/1986 |
| CN | 2040706 U | 7/1989 |

(Continued)

OTHER PUBLICATIONS

Jan. 12, 2021 International Search Report issued in International Patent Application No. PCT/CN2020/089274.
(Continued)

*Primary Examiner* — Reginald Alexander
(74) *Attorney, Agent, or Firm* — JCIPRNET

(57) ABSTRACT

An intelligent separation device has gas explosion, stirring, drying and negative pressure adsorption devices. The gas explosion device receives conveyed peanut materials with red coats to be removed, and the materials are subjected to gas explosion, so that the peanut kernels and the peanut red coats are preliminarily separated. The stirring device shifts the preliminarily separated peanut kernels and peanut red coats into the drying device. The drying device compresses and heating external air, transfers heat through hot air, and (Continued)

heats and dries the preliminarily separated peanut kernels and peanut red coats, so that the peanut red coats and the peanut kernels are fully separated. The negative pressure adsorption device collects the fully separated peanut kernels and red coats with different densities and masses in a negative pressure adsorption mode.

8 Claims, 8 Drawing Sheets

(51) Int. Cl.
    *A23N 5/01*         (2006.01)
    *A23N 12/08*       (2006.01)

(58) Field of Classification Search
    USPC .................................. 99/600, 601, 602, 609
    See application file for complete search history.

(56) References Cited

U.S. PATENT DOCUMENTS

| | | | | |
|---|---|---|---|---|
| 3,550,658 | A | * | 12/1970 | Lindsey .................. A23N 5/01 241/76 |
| 5,699,724 | A | * | 12/1997 | Wettstein .............. B07C 5/3425 99/600 |

FOREIGN PATENT DOCUMENTS

| | | | |
|---|---|---|---|
| CN | 1034850 | A | 8/1989 |
| CN | 2812597 | Y | 9/2006 |
| CN | 102178329 | A | 9/2011 |
| CN | 102697153 | A | 10/2012 |
| CN | 103504449 | A | 1/2014 |
| CN | 103892419 | A | 7/2014 |
| CN | 205993586 | U | 3/2017 |
| CN | 206324158 | U | 7/2017 |
| CN | 107736624 | A | 2/2018 |
| CN | 107874271 | A | 4/2018 |
| CN | 107897957 | A | 4/2018 |
| CN | 107981369 | A | 5/2018 |
| CN | 108514127 | A | 9/2018 |
| CN | 108783475 | A | 11/2018 |
| CN | 108991540 | A | 12/2018 |
| CN | 208909085 | U | 5/2019 |
| CN | 110026263 | A | 7/2019 |
| CN | 209152286 | U | 7/2019 |
| CN | 110250536 | A | 9/2019 |
| CN | 209391053 | U | 9/2019 |
| CN | 110506949 | A | 11/2019 |
| CN | 110584151 | A | 12/2019 |
| CN | 209711438 | U | 12/2019 |
| CN | 111317148 | A | 6/2020 |
| CN | 212035877 | U | 12/2020 |
| JP | H11-206357 | A | 8/1999 |
| JP | 2019-187449 | A | 10/2019 |
| KR | 10-2016-0122435 | A | 10/2016 |

OTHER PUBLICATIONS

Jan. 12, 2021 Written Opinion issued in International Patent Application No. PCT/CN2020/089274.
Feb. 3, 2021 Office Action issued in Chinese Patent Application No. 202010287365.2.
May 20, 2021 Office Action issued in Chinese Patent Application No. 202010287365.2.

* cited by examiner

INTELLIGENT SEPARATION DEVICE AND SEPARATION METHOD FOR PEANUT KERNEL AND PEANUT RED COAT

TECHNICAL FIELD

The present invention belongs to the technical field of separation control, especially relates to intelligent separation device and separation method for peanut kernel and peanut red coat.

BACKGROUND

The statement in this section merely provides background technical information related to the present disclosure and does not necessarily constitute a prior technology.

Peanut, also known as groundnut, is a kind of nut with rich yield and widely eaten in China. Peanut is composed of peanut kernel and a covered skin-red coat, and peanuts have rich medicinal value. Peanut kernels are rich in nutrients, containing protein, fat, vitamins, carbohydrates and trace elements. Peanut kernels also contain physiological active substances, which have health effects on the human body. Proved by pharmacological research, peanuts have the effects of removing free radicals, anti-aging, preventing heart, cerebrovascular diseases and cancer, brain improvement, beauty and other functions.

Peanut red coat, also known as peanut seed coat, peanut skin, etc., is a traditional Chinese medicine, mainly for hemostasis, blood stasis and swelling. The main component is proanthocyanidin, which has the effect of antioxidation, lowering blood pressure, lowering blood sugar and anti-allergy. Due to the different material characteristics and the ways used of peanut kernel and peanut red coat, the separation between peanut kernel and peanut red coat is very important. At present, most peanut processing enterprises mostly use mechanical methods, physical methods and chemical methods to conduct the separation between peanut kernel and peanut red coat. For physical method, wet peeling technology and dry peeling technology are mainly adopted; chemical method mainly uses alkali liquid immersion method and hydrogen peroxide soaking method; mechanical method mainly uses rubbing method, grinding method, etc. Among the above technological means, the temperature influence of physical method, chemical factors of chemical method, and mechanical defects of mechanical method will have a certain impact on the quality of peanut kernel and peanut red coat, and the subsequent process is more cumbersome. So it's a current technical challenge that the peanut kernel and peanut red coat are separated under the premise of low damage to the quality of them, and to minimize the impact on peanut kernel and peanut red coat.

After searching, Minglei Wang and Yuzhong Hu of Qingdao Dongsheng Group Co., Ltd. invented a device and process of peanut stripping by controlling temperature of low temperature segmentation and cooling rapidly (Patent No.: ZL201110095699.0), which its working process is follow: first of all, peanuts enter the first group of humidification boxes for humidification, the humidity of the first group of humidification boxes is 85%-90%, humidification for 3-4 minutes, and then into the first group of ovens baking for 18-24 minutes, the temperature of the first group of ovens is kept at 80-90° C.; Secondly, peanuts enter the second group of humidification boxes for humidification, the humidity of the second group of humidification boxes is 80%-85%, humidification for 3-4 minutes, and then into the second group of ovens baking for 18-24 minutes, the temperature of the second group of ovens is kept at 70-80° C.; Thirdly, peanuts enter the third group of humidification boxes for humidification, the humidity of the third group of humidification boxes is 70%-80%, humidification for 3-4 minutes, and then into the third group of ovens baking for 18-24 minutes, the temperature of the third group of ovens is kept at 65-70° C.; Finally, peanuts are cooled through the conveyor belt into the cooling device, whose temperature is set to −10-0° C. After cooling for 10-20 minutes, peanut red coats are broken and peeled off, while the cold source blower blows the peanut red coats to a red coats collector for recycling. The processing technology mainly uses the intermittence of low-temperature baking and the principle of thermal expansion and cold contraction of substance to make the peanut red coat fall off. The method has a higher overall efficiency, but also has the following disadvantages: the main internal nutrients of peanut red coats and peanut kernels are destroyed after multiple baking processes. In addition, the process causes the peanut red coat to break from the kernels, but not adequately peel from the peanut kernel.

After searching, Kaicun Yang invented a separation device for raw peanut surface red coats (Patent No.: ZL201810630104.9). In this invention, by setting a warm water soaking mechanism, peanuts are placed in inside the soaking space formed by a ring body soaked with warm water and baffles through the feed inlet, then adding warm water and stirring the shaft with warm water to accelerate the expansion of peanut red coats. After setting a friction peeling mechanism, the first rotating shaft drives the first friction rubber pad and the second friction rubber pad to rub peanuts, achieving the effect of taking out the wrinkled peanut red coats. A second rotating shaft drives the stirring peeling rod to remove the peanut red coats that cannot be completely removed. A drying and harvesting mechanism is set. After completing the peeled, the water will be discharged from the drainpipe, the electric heating wire will heat the air, and the fan will be started. The wind will be blown into the interior of the red coat peeling box through the inclined blowing mouth. After drying, the red coat will be blown into the interior of the leather bag by the wind through the leather tube, and the block will prevent the peanut kernels from entering the leather bag, which effectively solves the problem that the red coat stripping process cannot be carried out in batches at the same time, the processing time is long, and the work efficiency is affected to a certain extent. The mechanical approach is simple, but causes damage to peanut kernels, producing incomplete peanut kernels due to the inability to control specific travel problems. And it is difficult to remove peanut red coats through a single mechanical means, due to the viscosity of pectin between raw peanut kernels and peanut red coats.

After searching, the alkaline liquid immersion is also a prevalent method for chemical removal of fruit seed coat. The working principle is a chemical method that peanuts are soaked in a certain concentration of alkaloid for a certain amount of time, making the red coats soften and deteriorate and losing viscosity of pectin connecting the red coats and peanut kernel to achieve red coats removal by soaking of alkali solution with a certain temperature. The treatment is more efficient, but has several disadvantages: red coats removal should be washed with clean water to prevent alkali residue, which complicated the subsequent treatment process; the alkaloid itself is a chemical that reacts with the peanut kernels or the substances inside the red coats, causing the peanut red coats to damage the quality; Due to the temperature sensitivity of peanut red coats and peanut kernels, the peanut red coats are obviously affected by the temperature and caused damage; the washing link is not well controlled will have alkali residue, which has an impact on the quality of oil and human health. Therefore, this peeling method has large defects, cannot efficiently make high quality peanut kernels.

After searching, Xianyu He and Yungen Gao invented a rotary steam peeling machine (Patent No.: ZL200520073897.7). The principle is that the product is provided with a material agitator in a stationary mounted cooking tank which has steam ports and feeding and discharge ports. In operation, saturated steam is passed through the steam ports into the closed tank and the agitator is rotated by agitation to recover the steam to atmospheric pressure after several seconds of instantaneous pressure-maintaining cooking. A condensing water separator plate is located inside the tank. The condensing water separator plate is located inside the tank so that the material is not immersed in the high temperature water during the steaming process and the material is quenched. This process has the advantage of efficient peeling and contamination-free end products by quenching the tuberous material to force the skin of the material to separate from the flesh. However, this device suffers from the following disadvantages: firstly, there is uncertainty as to the temperature at which the steam is heated and therefore variations in the nutrient content of the material. Secondly, because the material is handled in the tank, the accumulation of material is so severe that the saturated steam cannot contact the material sufficiently and the peeling is inefficient. Thirdly, because the agitation is used in the cooking process, the collision of the material with the agitator scoop can cause destruction of the material and failure to preserve its integrity.

It can be seen that the known devices have not been developed in perfect terms, and the known red coats removing devices have not been ideal, with a low efficiency, insufficient separation and greater damage to the material.

SUMMARY

In overcoming the above-described deficiencies of the prior art, the present invention provides a smart peanut kernels and peanut red coats separation apparatus that physically and mechanically combines to separate peanut kernels from peanut red coats and to collect material and effectively separate peanut kernels from red coats without damaging the peanut kernels and peanut red coats qualities.

To achieve the above objects, one or more embodiments of the present invention provide the following technical scheme:

an intelligent separation device for peanut kernel and peanut red coat, including:

a gas explosion device, a stirring device, a drying device and a negative pressure adsorption device;

the gas explosion device receives the conveyed peanut material to be removed the red coats, allows the gas explosion of the material under the effect of the pressure differential by the infiltration of supersaturated vapors and the rapid depressurization, which completes the initial separation of the peanut kernels from the peanut red coats;

the stirring device stirs the preliminarily disengaged peanut kernels and peanut red coats into the drying device;

the drying device heats up the external air by compression, transferring the heat by hot air, and heats-drying the preliminarily disengaged peanut kernels and peanut red coats, so as to obtain a sufficient separation between the peanut red coats and peanut kernels;

the negative pressure adsorption device collects fully separated peanut kernels and peanut red coats which have different density and quality respectively through negative pressure adsorption.

In another aspect, one or more embodiments of the present invention to achieve the above object provide the following technical scheme:

an intelligent separation method of peanut kernels and peanut red coats, including:

through the infiltration of supersaturated steam and rapid pressure relief, the peanut material to be removed the red coat is gas exploded under the action of pressure difference to complete the preliminary separation of peanut kernel and peanut red coat;

the external air is compressed and heated, the heat is transferred through hot air, and the preliminarily separated peanut kernel and peanut red coat are heated and dried, so that the peanut red coat and peanut kernel are fully separated;

separate collection of substantially separate peanut kernels of different density quality and red coats by suction pressure.

the fully separated peanut kernel and peanut red coats with different density and quality are collected by negative pressure adsorption.

One or more of the above technical solutions have the following advantages:

the disclosed solution achieves intelligent separation of the peanut kernels and the red coats by gas explosion, with the combination of physical and mechanical methods, the peanut kernel and peanut red coat can be preliminarily and fully separated without damaging the quality of peanut kernel and peanut red coat, and the materials can be collected to improve the peeling rate of peanut and minimize the impact on the quality of the peanut kernels and peanut red coat.

The technical scheme of the present disclosure collects the fully separated peanut kernel and red coat with different density and quality through negative pressure adsorption, and fully collects the peanut kernel and red coat respectively through the different density of the two materials.

The technical scheme of the present disclosure compresses the external air to rise temperature, transfers heat through hot air, and heats and dries the preliminarily separated peanut kernel and peanut red coat, so that the peanut red coat and peanut kernel are fully separated, ensuring the requirements of low energy loss and economy in the drying system.

BRIEF DESCRIPTION OF THE DRAWINGS

The accompanying drawings constituting a part of the present invention are used to provide a further understanding of the present invention. The exemplary examples of the present invention and descriptions thereof are used to explain the present invention, and do not constitute an improper limitation of the present invention.

FIG. 2(*b*) is an isometric view of a feeding device of embodiment 1 of the present disclosure;

Figure 1:
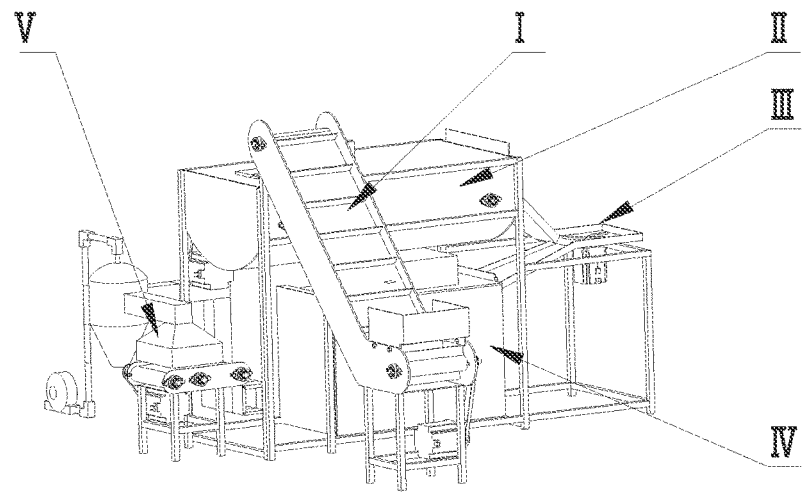
FIG. 1 is an isometric view of an air explosion principle negative pressure adsorption air energy peanut kernel and peanut red coat intelligent separation device of embodiment 1 of the present disclosure.

In the figure, conveying device I, gas explosion device II, stirring device III, drying device IV, negative pressure adsorption device V;

I-01-feeding device, I-02-conveying baffle, I-03-flexible conveyor belt, I-04-conveying driving shaft, I-05-conveying driving shaft pulley, I-06-feeding device drive belt, I-07-feeding device stepper motor, I-08-feeding device stepper motor pulley, I-09-conveying driven shaft, I-10-bearing seat assembly, I-11-conveying slide plate, I-12-feeding device fixed bolt set, I-0101-feeding device inclined plate, I-1001-bearing seat unit, I-1002-conveying device fixed nut, I-1003-conveying device fixed bolt;

II-01-gas explosion chamber, II-02-gas explosion feeding slide door, II-03-gas explosion feeding slide rail, II-04-gas explosion discharge slide door, II-05-gas explosion discharge slide rail, II-06-gas explosion drive belt, II-07-gas explosion motor pulley, II-08-gas explosion driving motor, II-09-gas explosion stainless steel conveyor belt, II-10-gas explosion conveyor net baffle, II-11-gas explosion buffer brush, II-12-gas explosion conveyor driving shaft, II-13-gas explosion conveyor driven shaft, II-14-gas explosion positioning landing plate, II-15-gas explosion conveyor driving shaft pulley, II-0101-steam generator port, II-0102-condensate water discharge recovery port, II-0103-pressure relief valve connection port;

III-01-stirring feeding mechanism, III-02-stirring vane, III-03-stirring driving motor, III-04-stirring discharge mechanism;

IV-01-drying generator, IV-02-drying discharging slide rail, IV-03-drying discharging slide door, IV-04-air energy heat source port, IV-05-drying feeding slide rail, IV-06-drying feeding slide door, IV-07-drying fan, IV-08-drying conveying slide rail, IV-09-drying vibration conveying device, IV-10-drying driving shaft pulley, IV-11-drying driving belt, IV-12-drying driving motor, IV-13-drying driving motor pulley, IV-14-drying sealing plate, IV-15-drying red coat collecting tank, IV-16-drying conveying rail, IV-17-drying buffer brush; IV-0901-drying conveying baffle, IV-0902-drying stainless steel conveying network, IV-0903-drying conveying driving shaft, IV-0904-drying conveying vibration roller; IV-0905-drying conveying supporting shaft, IV-0906-drying conveying vibration roller pulley, IV-0907-drying vibration belt, IV-0908-drying conveying driven shaft, IV-0909-drying conveying driven shaft pulley;

V-01-primary negative pressure collecting mechanism; V-02-secondary negative pressure collection device; V-03-negative pressure storage unit; V-04-negative pressure pipeline; V-05-negative pressure fan; V-06-negative pressure conveying device; V-07-airbag; V-0601-negative pressure conveying belt; V-0602-negative pressure vibration roller pulley; V-0603-negative pressure vibration roller; V-0604-negative pressure vibration belt; V-0605-negative pressure driven shaft; V-0606-negative pressure driven shaft pulley; V-0607-negative pressure driving belt; V-0608-negative pressure driving motor pulley; V-0609-negative pressure driving motor; V-0610-negative pressure driving shaft; V-0611-negative pressure driving shaft pulley.

DETAILED DESCRIPTION

It should be noted that, the following detailed descriptions are exemplary, and are intended to provide further understanding for this application. Unless otherwise defined, the technical terms or scientific terms used herein should have general meanings understood by a person of ordinary skill in the field of this application.

It should be noted that, the terminology used herein is for the purpose of describing specific embodiments only and is not intended to be limiting of exemplary embodiments. As used herein, the singular terms are intended to include plural referents unless the context clearly dictates otherwise. In addition, it should be further understood that, the terms "include" and/or "comprise" when used in this specification, indicate the presence of features, steps, operations, elements, components and/or a combination thereof.

Without conflict, the embodiments and features in the embodiments of the present invention can be combined with each other.

Example 1

The present invention discloses an intelligent separation device for peanut kernel and peanut red coat, as shown in FIG. 1, comprising a conveying device I fixed to a frame, a gas explosion device II, a stirring device III, a drying device IV, and a negative pressure adsorption device V. The gas explosion device is disposed behind the conveying device, the stirring device is disposed in a subsequent portion of the gas explosion device, the drying device is disposed in a subsequent processing section of the stirring device, and a collection device is disposed behind the drying device.

Figure 2A:
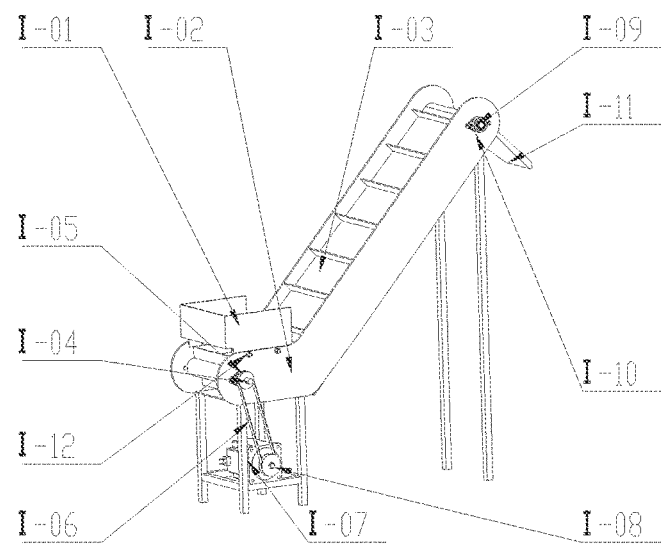
FIG. 2(*a*) is an isometric view of a conveying device of embodiment 1 of the present disclosure.
Figure 2B:
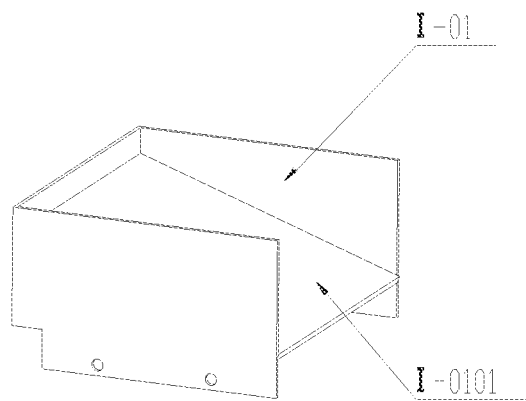

In a specific example, the structure of the conveying device shown in FIG. 2(*a*) comprises a feeding device I-01, a flexible conveyor belt I-03, a driving part, a tail of the flexible conveyor belt provided with a conveying slide plate I-11, and two sides of the flexible conveyor belt provided with a conveying baffle I-02.

The driving part specifically includes: a conveying driving shaft I-04, a conveying driving shaft pulley I-05, a feeding device drive belt I-06, a feeding device stepper motor I-07, a feeding device stepper motor pulley I-08, a conveying driven shaft I-09.

A conveying driving shaft pulley I-05 mounted on the conveying driving shaft I-04, the feeding device stepper motor pulley I-08 mounted on the feeding device stepper motor, and the feeding device drive belt I-06 connects the conveying driving shaft pulley I-05 and the feeding device stepper motor pulley I-08. The feeding device stepper motor I-07 is fixed to the frame, and the entire movement of the feeding device is performed by the feeding device stepper motor I-07. The conveying driving shaft I-04 and the conveying driven shaft I-09 are connected with the conveying baffle I-02 through a bearing seat assembly; the conveying baffle is used to prevent material from falling down.

As shown in FIG. 2(*b*), a feeding device inclined plate I-0101 is welded to the inner side of the feeding device I-01 as a mechanism for buffering materials, and the slope design of the inclined plate in the feeding device engages the height of the conveyor belt. The lower end of the inclined plate is slightly higher than the upper ends of the baffle in the conveyor belt, which can prevent the jamming when the conveyor belt rotates, and greatly reduce the damage of peanuts.

The conveying device is fed by the feeding device I-01, and the feeding device I-01 is connected with the conveying baffle I-02 by a feeding device fixed bolt set I-12, and the feeding operation of the flexible conveyor belt I-03 is performed by the inner slope of the feeding device I-01, and the slope of the feeding device I-01 is set to cushion the fall of the peanuts. The feeding device I-01 is fixed by the feeding device fixed bolt and nut set with the conveying baffle I-02 preventing the material from slipping down and falling down the conveyor belt. The feeding operation of the flexible conveyor belt I-03 is performed by the feeding device stepper motor I-07 driving the conveying driving shaft I-04. Materials are conveyed on the flexible conveyor belt I-03, after reaching a conveying slide plate I-11, then sliding down to the subsequent process. The conveying slide plate I-11 is welded to the conveying baffle, which plays the role of butt joint between the conveying device and the gas explosion device, so as to reduce the damage of peanuts when entering the subsequent treatment device.

Figure 3:
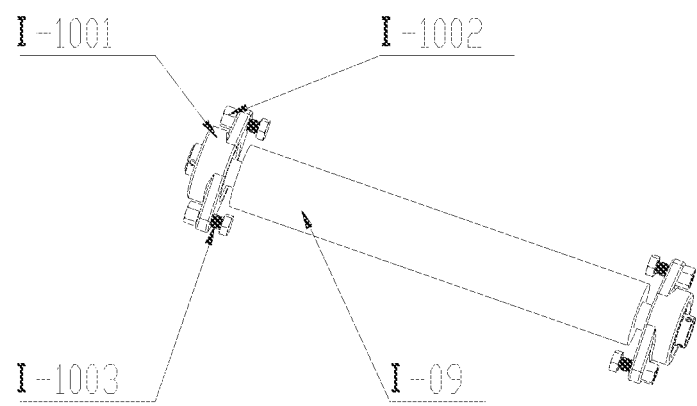
FIG. 3 is an isometric view of a driven shaft of embodiment 1 of the present disclosure.

The specific structure and installation of the bearing seat assembly is shown in FIG. 3. The bearing seat assembly I-10 fixes the transfer baffle I-02 with the conveying driving shaft I-04 and the conveying driven shaft I-09; the bearing seat assembly comprises a bearing seat unit I-1001, a conveying device fixed nut I-1002, a conveying device fixed bolt I-1003.

Figure 4:
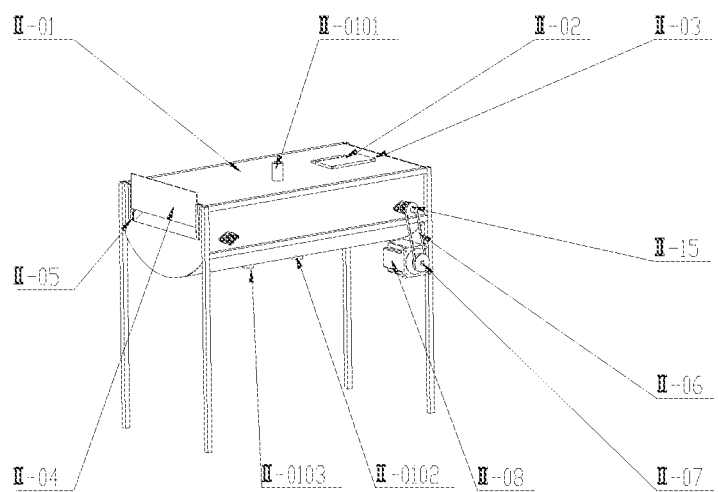
FIG. 4 is an isometric view of the exterior of an explosion chamber of embodiment 1 of the present disclosure.

As shown in FIG. 4, the explosion device II includes a gas explosion chamber II-01, on which a steam generator port II-0101 connected to the steam generator to generate steam, and a condensate water discharge recovery port II-0102 connected to a subsequent air-energy heat pump to recover the condensate water for high economic efficiency. In additional, a pressure relief valve connection port II-0103, through the pressure relief operation to carry out a treatment of rapid pressure relief, making the peanut red coats rupture with pressure difference.

The gas explosion chamber II-01 is provided with a gas explosion feeding slide door II-02 and a gas explosion feeding slide rail II-03 on one side, and a gas explosion discharge slide door II-04 and a gas explosion discharge slide rail II-05 on the other side. Through the cooperation of the gas explosion feeding slide door II-02 and the gas explosion feeding slide rail II-03, the materials on the conveying sliding plate I-11 at the end of the gas explosion feeding slide rail will slide into the gas explosion generation chamber. After the explosive process in the gas explosion chamber is completed, the materials fall into the subsequent treatment device through the cooperation of the gas explosion discharge sliding door II-04 and the gas explosion discharge sliding rail II-05.

Figure 5:
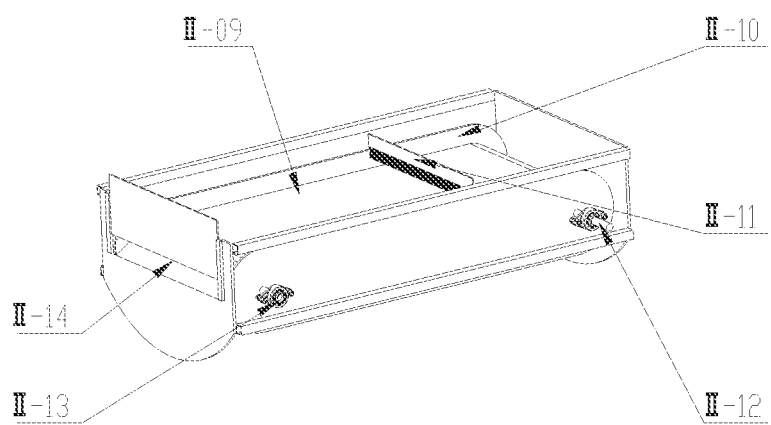
FIG. 5 is an isometric view of the interior of an explosion chamber of embodiment 1 of the present disclosure.

Specifically, as shown in FIG. 5, a gas explosion buffer brush II-11 and a gas explosion stainless steel conveyor belt II-09 are installed in the gas explosion chamber II-01. Materials are transported through the conveying slide plate I-11 to the gas explosion stainless steel conveyor belt II-09 with a movement of the gas explosion feeding slide door II-02 and the gas explosion feeding slide rail II-03. A gas explosion drive motor II-08 drives the gas explosion drive motor drive shaft II-12 and the gas explosion conveying drive shaft e, through the action of the gas explosion buffer brush II-11, make the peanut kernel to avoid the accumulation phenomenon and reduce the damage to the peanut kernel. The steam generator is connected to a steam generator port II-0101 to fully saturate the surface of the peanuts, and then a pressure relief valve connection port II-0103 is used to make the peanut red coat produce gas explosion due to pressure difference, so as to separate the peanut red coat from the peanut kernel.

The gas explosion driving motor II-08 is mounted on the frame and a gas explosion motor pulley II-07 is mounted on the gas explosion driving motor II-08. A gas explosion conveyor driving shaft pulley II-15 is mounted on the gas explosion conveyor driving shaft II-12. A gas explosion drive belt II-06 connects the gas explosion conveyor driving shaft II-12 and the gas explosion conveyor driven shaft II-13. The movement of the gas explosion device conveying mechanism is driven by the gas explosion driving motor II-08. A gas explosion conveyor net baffle II-10 is mounted on the gas explosion conveyor driving shaft II-12 and the gas explosion conveyor driven shaft II-13 by bearing seat unit to prevent material from falling off. A gas explosion positioning landing plate II-14 is welded to the inside of the gas explosion conveyor net baffle II-10, serving as a transfer function of materials for the gas explosion device and the stirring device, on the other hand, slowing down the materials and preventing to damage the materials.

The conveyor net in the gas explosion chamber is made of stainless steel with the upper part of the gas explosion buffer brush. The peanut kernels are conveyed through a stainless steel conveying system, and buffered by the buffer brush to avoid accumulation, which is then operated by the steam generator and the pressure relief valve to achieve the effect of peanut red coats removal through the gas explosion.

The surface infiltration of peanut kernels was carried out by means of gas explosion. First, a steam generator is used to generate steam with a certain temperature and pressure, and then the steam with a certain pressure enters the red coats interior during the process of steam infiltration on the peanut surface. A rapid pressure blow down occurs within and around the red coats, which causes the peanut red coats to burst, thereby separating the peanut red coats from the peanut kernels.

By means of supersaturated steam infiltration and rapid pressure relief, the gas explosion treatment of peanut kernels with different sizes can be realized, resulting in the rupture of peanut red coat, improving the peeling rate of peanut and reducing the damage to peanut kernel and peanut red coat. The recovery of condensate water is carried out through the cooperation of the stainless steel conveying network and the steam generator.

Figure 6:
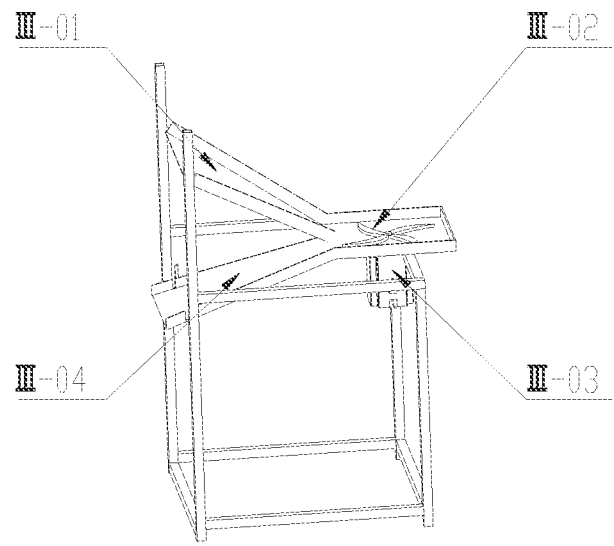
FIG. 6 is an isometric view of a stirring device of embodiment 1 of the present disclosure.

As shown in FIG. 6, a stirring device III comprises a stirring feeding mechanism III-01, a stirring vane III-02, a stirring driving motor III-03 and a stirring discharge mechanism III-04.

The material is fed by the stirring feeding mechanism III-01, and the stirring vane III-02 is driven to rotate by the stirring driving motor III-03, so that the material enters the next link by the stirring discharge mechanism III-04. Due to a control of a rotating speed of the stirring driving motor III-03, the feeding rate of the materials can be better controlled.

A slope setting of the stirring feeding mechanism and the stirring discharge mechanism of the stirring device is consistent, so that the feeding rate of the stirring vane is consistent with the feeding rate of the subsequent drying chamber, so as to prevent the accumulation of peanuts, resulting in the blocking of the stirring vane and making the rotation speed of a stirring disc is consistent with the conveying speed of the conveying network of the subsequent drying device. The peanut kernel material is conveyed by the rotation of the stirring vane, the feeding speed of the peanuts is realized by controlling the rotating speed of stirring vane, and the accumulation of the peanuts is better slowed down.

Figure 7:
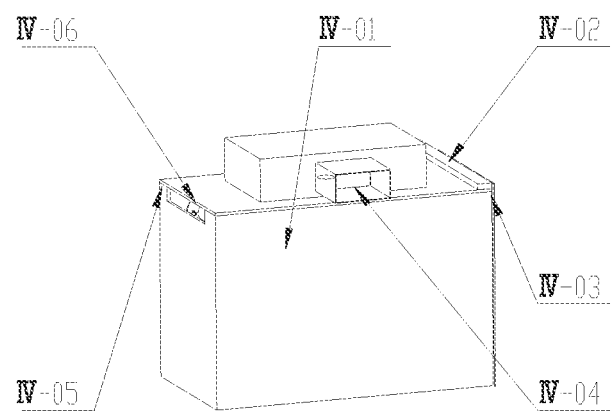
FIG. 7 is an isometric view of the exterior of a drying chamber of embodiment 1 of the present disclosure.

As shown in FIG. 7, the drying device comprises a drying generator IV-01, one side of the drying generator IV-01 is provided with a drying feeding slide rail IV-05 and a drying feeding slide door IV-06 which work in a matched mode, the other side of the drying generator IV-01 is provided with a drying discharging slide rail IV-02 and a drying discharging slide door IV-03 which work in a matched mode, and the top of the drying generator IV-01 is further provided with an air energy heat source port IV-04.

Figure 8:
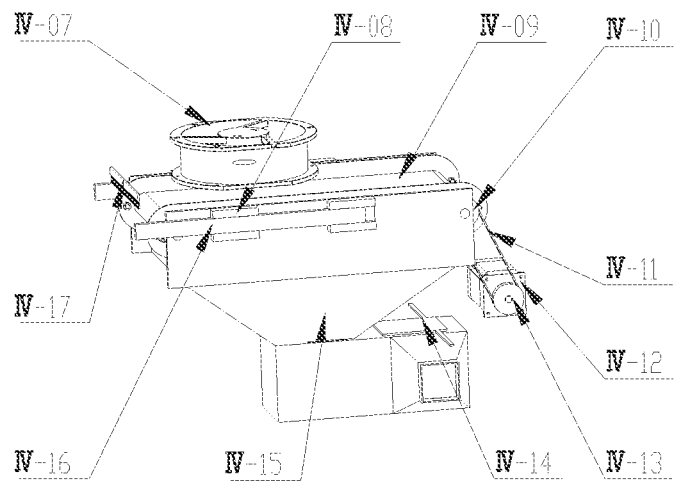
FIG. 8 is an isometric view of the interior of a drying chamber of embodiment 1 of the present disclosure.

The internal structure of the drying generator IV-01 is shown in FIG. 8, and a drying fan IV-07, a drying conveying slide rail IV-08, a drying vibration conveying device IV-09, a drying driving shaft pulley IV-10, a drying driving belt IV-11, a drying driving motor IV-12, a drying driving motor pulley IV-13, a drying sealing plate IV-14, a drying red coat collecting tank IV-15, a drying conveying rail IV-16 and a drying buffer brush IV-17 are arranged inside the drying generator IV-01.

The drying fan IV-07 is fixed at the top of the drying generator IV-01 and is used for transferring heat input by the air energy heat pump. A drying conveying supporting shaft IV-0905, a drying conveying driven shaft IV-0908, a drying conveying vibration roller IV-0904 and a drying conveying driving shaft IV-0903 are fixed on the two side of a drying conveying baffle IV-0901. The drying driving shaft pulley IV-10 is fixed on the drying conveying driving shaft IV-0903, and a drying conveying driven shaft pulley IV-0909 is fixed on the drying conveying driven shaft IV-0908. A drying conveying vibration roller pulley IV-0906 is fixed on the drying conveying vibration roller IV-0904, the drying driving motor pulley IV-13 is fixed on the drying driving motor IV-12 which is mounted on the frame.

The drying driving belt IV-11 is connected with the drying driving shaft pulley IV-10 and the drying driving motor pulley IV-13, and a drying vibration belt IV-0907 is connected with the drying conveying driven shaft pulley IV-0909 and the drying conveying vibration roller pulley IV-0906. A movement of the drying conveying driving shaft IV-0903 which drives the drying conveying driven shaft IV-0908 to move through the drying stainless steel conveying network IV-0902 is driven by the drying driving motor IV-12. The drying conveying vibration roller IV-0904 is driven by the drying conveying driven shaft IV-0908 to play a vibration role.

The drying conveying slide rail IV-08 and the drying sealing plate IV-14 are fixed on the inner wall of the drying generator IV-01. The drying buffer brush IV-17 is fixed on the upper part of the drying generator IV-01, so that the phenomenon of material accumulation is avoided. The drying conveying slide rail IV-08 is fixed on the drying red coat collecting tank IV-15 and used for the whole conveying process inside the drying generator IV-01. The drying sealing plate IV-14 is used for sealing the red coats drying collection tank after moving.

Figure 9:
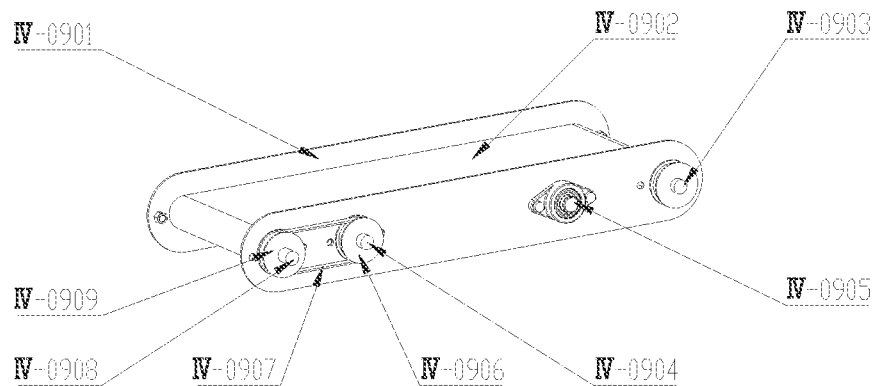
FIG. 9 is an isometric view of a conveying mechanism of drying chamber of embodiment 1 of the present disclosure.
Figure 10:
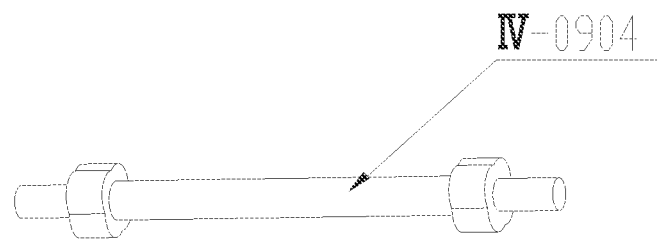
FIG. 10 is an isometric view of a vibration roller of drying chamber of embodiment 1 of the present disclosure.

As shown in FIGS. 9 and 10, the drying vibration conveying device IV-09 includes: a drying conveying baffle IV-0901, the drying stainless steel conveying network IV-0902, the drying conveying driving shaft IV-0903 and the drying conveying vibration roller IV-0904.

The drying conveying driving shaft IV-0903, the drying conveying driving shaft IV-0904 and the drying conveying baffle IV-0901 are connected through the bearing seat unit. The drying conveying driving shaft IV-0903 is driven by the drying driving motor IV-12, making the drying vibration conveying device IV-09 operates. The drying conveying driving shaft IV-0903 is connected with the drying conveying vibration roller IV-0904 through a pulley, so that the drying vibration conveying device IV-09 has a vibrating effect, and the peanut red coats and the peanut kernels are separated.

Peanuts feeding operation is carried out through the drying feeding slide rail IV-05 and the drying feeding slide door IV-06 which are installed in a mode of a slide rail inner buckle of a guide rail. The drying feeding slide rail IV-05 and the drying feeding slide door IV-06 are controlled by programs to enable the device to be in a closed state all the time, and to reduce heat loss. When the peanut is conveyed to the drying vibration conveying device IV-09, the peanut delivery is conducted by the drying driving motor IV-12 driving the drying vibration conveying device IV-09. The vibration of the drying conveying vibration roller IV-0904 causes a slight collision and shaking between the peanuts, so as to achieve the uniform heating and peeling effect of the peanut red coats, and a part of the separated red coats enter the drying red coat collecting tank IV-15. The drying process is a heat conveying process which is performed by connecting an air-source heat pump with an air energy heat source port IV-04 to provide heat and performing heat conveying by using the drying fan IV-07. After the drying process is finished, the drying discharge slide rail IV-02 and the drying discharge slide door IV-03 are matched, and the drying conveying slide rail IV-08 and the drying conveying rail IV-16 are used for carrying out handover with a subsequent device. In the handover process, the drying red coat collecting tank IV-15 is blocked by the drying sealing plate IV-14 to form a closed loop, so that the subsequent red coats collecting operation is facilitated.

The drying mechanism adopts an air energy heat pump as a heat source, heat is transferred through a fan, the appropriate temperature change range is controlled, damage to peanut red coats is reduced, and low power consumption, economy and environmental friendliness of equipment are guaranteed.

For the peeling red coats on the drying vibration conveyor belt, the drying red coat collecting tank arranged on the drying vibration conveyor belt is used for collection.

The vibration effect of the drying vibration conveyor belt is determined by the vibration frequency and the vibration amplitude of the conveyed materials according to the profile and the rotating speed of a cam on a driven shaft.

The air source heat pump is adopted for heating, external air is compressed and heated, and heat is transferred through hot air, so as to ensure the low loss of energy and economic requirements in the drying system.

Figure 11:
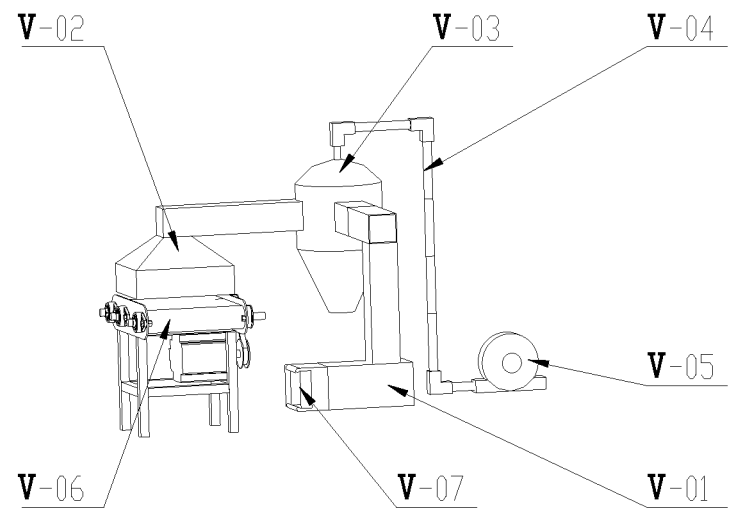
FIG. 11 is an isometric view of a collection device of embodiment 1 of the present disclosure.

As shown in FIG. 11, the negative pressure adsorption device includes a negative pressure fan, a negative pressure pipeline, a negative pressure conveying device, a primary negative pressure collecting mechanism, a secondary negative pressure collecting mechanism, and a negative pressure storage unit.

The primary negative pressure collecting mechanism is connected to the negative pressure storage unit, but also to the secondary negative pressure collecting mechanism, which is connected to the negative pressure conveying device, and the negative pressure fan is connected to the negative pressure storage unit through the negative pressure pipeline.

Figure 12:
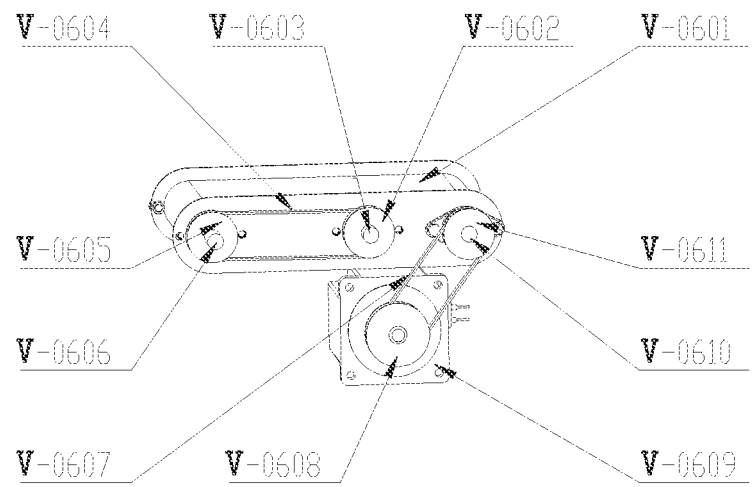
FIG. 12 is an isometric view of a conveying mechanism of collection device of embodiment 1 of the present disclosure.
Figure 13:
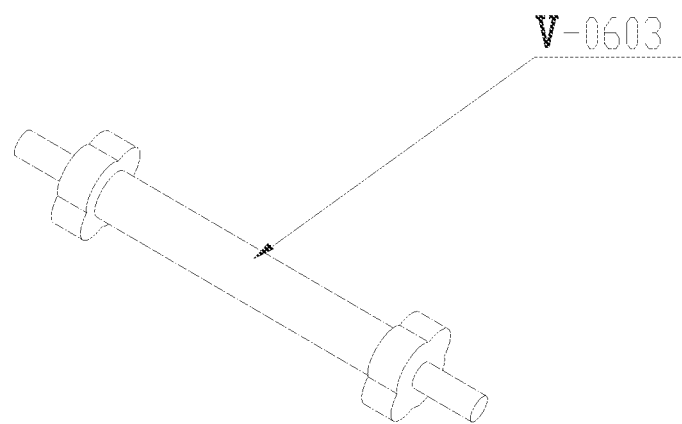
FIG. 13 is an isometric view of a vibration roller of collection device of embodiment 1 of the present disclosure.

As shown in FIG. 12, a negative pressure driving shaft pulley V-0611 is fixed on a negative pressure driving shaft V-0610, a negative pressure driven shaft pulley V-0606 is fixed on a negative pressure driven shaft V-0605, a negative pressure vibration roller pulley V-0602 is fixed on a negative pressure vibration roller V-0603, a negative pressure driving motor pulley V-0608 is fixed on a negative pressure driving motor V-0609, the negative pressure driving motor V-0609 is fixed on the frame, a negative pressure driving belt V-0607 is connected with the negative pressure driving shaft pulley V-0611 and the negative pressure driving motor pulley V-0608, a negative pressure vibration belt V-0604 is connected with the negative pressure driven shaft pulley V-0606 and the negative pressure vibration roller pulley V-0602, the negative pressure driving motor V-0609 drives the negative pressure driving shaft V-0610 to move, and the negative pressure driving shaft V-0610 drives a negative pressure driven shaft V-0605 to move through a negative pressure conveying belt V-0601, the negative pressure driven shaft V-0605 drives the negative pressure vibration roller V-0603, as shown in the FIG. 13, so as to play a role in vibration.

Materials enter the negative pressure adsorption device V through the connection of the drying device IV, the drying red coat collecting tank IV-15 is connected with a primary negative pressure collecting mechanism V-01, a certain amount of red coats fall off in the drying red coat collecting tank IV-15 in the drying process, and due to the negative pressure effect of a negative pressure fan V-05, an airbag V-07 on the primary negative pressure collecting mechanism V-01 is contracted inwards, so that the pipeline is closed, and the suction loss of negative pressure adsorption is reduced. The materials are conveyed by a negative pressure conveying device V-06, the part of the red coats which does not fall off is attached to the conveying belt and the peanuts, and the red coats are collected for the second time by a secondary negative pressure collection device V-02; the collected red coats enter a negative pressure storage unit V-03 through a negative pressure pipeline V-04, and an iron net is arranged at the upper part of the negative pressure storage unit to prevent incomplete collection of the red coats.

Through the two-stage collection device, the peanut red coat can be collected completely to prevent the secondary return drying of the material collection box, resulting in the destruction of red coat nutrients.

The airbag V-07 is arranged outside a primary collecting mechanism, and the sealing effect of the negative pressure adsorption pipeline can be realized through negative pressure adsorption.

The movement of the guide rail enables the device to be accurately connected with the primary collection mechanism, collecting the red coats twice at same time, has avoided the damage of nutrients of the red coats caused by red coats re-entering the device for repeated heating. By combining the negative pressure adsorption and the negative pressure conveying device, the peanut kernels and the red coats with different densities and qualities are fully and respectively collected. The combination of negative pressure adsorption and vibration conveyer belt, through the density difference of two kinds of materials, can fully collect peanut kernels and red coats respectively.

The primary collection mechanism and a secondary collection mechanism are respectively connected with the material storage unit, corresponding pipelines are all negative pressure pipelines, the whole pipeline is also a negative pressure pipeline; the primary collection unit collects the red coats in the material collection box, and sends the red coats to the drying red coat collecting tank IV-15 after the red coats are coming out through the guide rail; the drying red coat collecting tank IV-15 is connected with a pipe orifice of the drying generator IV-01.

The secondary collection unit sucks the red coats mixed with peanut kernel that have not fallen into the collection box through the secondary negative pressure collection mechanism V-02 on the conveyor belt of the negative pressure conveyor V-06.

The peanut kernels are conveyed to the next process through the conveying belt of the negative pressure conveying device V-06, and a hopper is arranged at the opening of the next process.

The working principle of the negative pressure adsorption intelligent separation device for peanut kernel and peanut red coat based on the gas explosion principle of the present disclosure is as follows:

the peanuts enters the conveying device through the feeding device, the conveying device performs feeding operation of the gas explosion device, and the buffering effect of the buffering step enables the material to enter the conveying net of the gas explosion chamber, the buffering brush is arranged above the gas explosion chamber, and accumulation of peanut red coats is avoided. Through the infiltration purpose of the supersaturated steam and the rapid pressure relief, the material is subjected to a larger pressure difference to achieve the effect of gas explosion, and the work of separating the peanut kernels from the peanut skin is completed. After the peanuts pass through the gas explosion device, most of the red coats on the peanut kernels are broken, the red coats are still attached to the peanut kernels due to the fact that the moisture content is too high, and the moisture content in the red coats of the peanuts is reduced and the red coats of the peanuts are fully separated from the peanut kernels through the combination of the air source heating and the drying vibration conveyor belt. The peanut red skin and the peanut kernels are adsorbed and separated by negative pressure adsorption through different mass densities, and the peanut kernels are separated from the red skin more fully through the vibration time and the vibration frequency of the negative pressure adsorption vibration conveyor belt.

The device integrates the four functions of peanut feeding, red coat removal, drying and collection. The material conveying function of the gas explosion chamber is realized through the conveyor belt conveying and the opening and closing of the gas explosion device. The stainless steel conveyor network is built in the gas explosion chamber, and the material is conveyed to the drying device through the cooperation of the conveyor belt transportation and the dial device. The connection with the collection device is realized through the built-in vibration conveying belt of the drying device, and finally the classified collection of materials is carried out through negative pressure adsorption. The present disclosure overcomes the problems of easy damage of peanut kernel, uneven heating of peanut and low efficiency of removing red coat.

Example 2

The purpose of this embodiment is to provide an intelligent separation method for peanut kernel and peanut red coat, including:

The peanut material to be removed the red coat is gas exploded under the action of pressure difference through the infiltration of supersaturated steam and rapid pressure relief, so as to complete the preliminary separation of peanut kernel and peanut red coat;

the outside air is compressed to raise the temperature, the heat is transferred through hot air, to heat and dry the primarily separated peanut kernels and peanut red coats, so as to fully separate the peanut red coats from the peanut kernels;

and the fully separated peanut kernels and red coats with different densities and qualities are respectively collected by a negative pressure adsorption mode.

Before introducing the following procedures, the data is displayed by inspection: the peanut red coats and the peanut kernels are influenced by temperature to change, and the temperature bearing range of the change of nutrient substances of the peanut kernels is larger than that of the peanut red coats, so that the optimum temperature of the peanut red coats is selected as the reference temperature in the engineering. The optimum extraction temperature of peanut red coats is 50-55° C., and the structure of polyphenols and proanthocyanidin haematochrome is damaged when the temperature is more than 55° C., so that the temperature of 55° C. is selected to be the appropriate temperature for separating the red coats from the peanut.

The surface infiltration of peanut kernels is carried out by gas explosion method. Firstly, a steam generator is utilized to generate steam with certain temperature and certain pressure, and then the steam with certain pressure enters the red coats by utilizing the process of infiltrating peanuts on the surface of the steam. Due to the existence of rapid pressure relief, pressure difference is generated inside and outside the peanut red coats, so that the peanut red coats bursts, and the peanut red coats are separated from the peanut kernels.

Assuming that the peanut red coats are completely soaked by steam with certain pressure, the pressure contained in the peanut red coats is the pressure of the steam:

$$F = \frac{p}{s}$$

Due to the existence of pressure relief conditions in the next step, the pressure in peanut red coat will change to atmospheric pressure;

So the gas explosion power of the peanut red coats is $$F = \frac{(p - p_0)}{s},$$

$$F_f = F - f_0,$$

wherein, p is the steam pressure generated by the steam generator, $p_0$ is the standard atmospheric pressure after pressure relief, s is approximate to the contact area of the peanut red coats, $f_0$ is the adhesive force of the pectin, and $F_f$ is the net force.

The atmospheric pressure is approximately 0.1 mpa, the steam pressure is 0.3 mpa, and the force generated by the pressure difference is enough to burst the peanuts red coats.

Table 1 is a comparison table of temperature and pressure of partially saturated steam.

TABLE 1

| Pressure/Mpa | Temperature/° C. |
|---|---|
| 0.0010 | 6.9491 |
| 0.0050 | 32.8793 |
| 0.010 | 45.7988 |
| 0.1 | 99.634 |
| 0.15 | 111.378 |
| 0.2 | 120.240 |
| 0.25 | 127.444 |
| 0.3 | 133.556 |
| 0.35 | 138.891 |
| 0.4 | 143.642 |

Selection of the steam generator is:

$$W = \frac{M \cdot Y \cdot \Delta T}{t},$$

wherein, W is the power of the steam generator, M is the mass, Y is the specific heat capacity, $\Delta T$ is the temperature difference, and t is the time.

Heat calculation and conversion method of steam and hot water (i.e. heat conversion and conversion of various work states) is: $Q = C \times M \times \Delta T$, wherein, Q is heat, unit is kJ; C is the specific heat capacity of water, unit is kJ/(Kg*° C.), the value for water is 4.2; M is water quantity, unit is kg; $\Delta T$ is temperature difference; obtaining 1 kg of saturated steam (100° C.) converted into 1 kg of boiled water can release 2737.6 kJ of heat.

In order to control and study the temperature of the steam generator, a mathematical model of a temperature model is first modeled, and the heating mode of the steam generator is a heating mode that cold water enters a heating box, and the cold water is heated to water with the temperature close to 100° C. and then becomes gaseous water vapor. According to the thermodynamic law, three variables of cold water, hot water and steam need to be considered for modeling the steam temperature, therefore, assuming that Q is the heat of the steam in the heating cylinder in unit time, $Q_C$ is the heat of the cold water entering the heating cylinder, and $Q_\alpha$ is the heat of the hot water in the heating cylinder, in an ideal state, other lost heat is ignored, and then the heat change Q in the heating cylinder in unit time is:

$$\frac{dQ}{dt} = Q_S + Q_C + Q_a,$$

wherein, $Q_S = W \times H$, W represents steam flow, and H represents steam enthalpy.

$$Q_C = q_C \cdot C_C \cdot \theta_C,$$

$$Q_\alpha = q_\alpha \cdot C_\alpha \cdot \theta_\alpha,$$

wherein, $q_\alpha$, $q_C$ represent the flow rates of hot water and the flow rates of cold water in the heating cylinder; $\theta_\alpha$, $\theta_C$ represent the temperatures of the cold water and the temperatures of hot water; $C_\alpha$, $C_C$ represent the specific heat capacities of the cold water and the specific heat capacities of hot water; under ideal conditions:

$C_\alpha = C_C = C$, $Q = V \cdot \theta_\alpha \cdot \gamma$; wherein, V represents the volume of water in the heating cylinder, and $\gamma$ represents the density of the water in the cylinder.

According to the above summary and calculation, the steam generator with rated power of 6 kW and steam volume of 200 kg/h is selected.

According to table 1, since the temperature of the saturated steam at 0.3 mpa is too high, a pipeline cooling mode is adopted, and a temperature control device and a pipeline device are added to cool the saturated steam until the temperature reaches 55° C. so as to perform steam explosion effect on the air pipe.

$$T = \frac{\rho v}{V}$$

In the formula, T is the running time of the steam generator, v is the steam quantity, V is the volume of the gas explosion chamber, and ρ is the density of saturated steam.

In the most general heat transfer, the temperature varies with time and three spatial coordinates, with heat generation or consumption (e.g., heat of reaction). The thermal diffusion equation is:

$$\frac{\partial}{\partial x}\left(k\frac{\partial T}{\partial x}\right) + \frac{\partial}{\partial y}\left(k\frac{\partial T}{\partial y}\right) + \frac{\partial}{\partial z}\left(k\frac{\partial T}{\partial z}\right) + q = \rho c_p \frac{\partial T}{\partial t},$$

wherein t is time; x, y and z are coordinate axes; ρ is the density; $c_p$ is constant pressure specific heat capacity; the thermal diffusion equation states that: at any point in the medium, the net rate of heat transfer into a unit volume plus the rate of thermal energy production per unit volume must equal the rate of change of stored energy per unit volume.

If the thermal conductivity k is a constant, the thermal diffusion equation can be expressed again as follows:

$$\frac{\partial^2 T}{\partial^2 x} + \frac{\partial^2 T}{\partial^2 y} + \frac{\partial^2 T}{\partial^2 z} + \frac{q}{k} = \frac{1}{\alpha} \times \frac{\partial T}{\partial t},$$

α is called the thermal diffusion coefficient, $$\alpha = \frac{k}{\rho c_p},$$

The capacity that the internal temperature of the object tends to be uniform in the non-steady-state heat conduction process is shown, namely, the larger the temperature conduction coefficient is, the faster the temperature tends to be uniform;

the heat transfer time of the peanut material is about 20 s according to a heat conduction equation.

$$a = 10cv * \frac{2}{3}$$

α represents a relief area, c represents a relief ratio, and v represents a displacement.

The pressure relief ratio is the ratio of the internal pressure and the external pressure, and the pressure relief time t is calculated to be consistent with the external atmospheric pressure.

The current drying and heating modes are infrared heating, electromagnetic heating, microwave heating, resistance heating, air energy heating and the like. The combination of air energy heating and a fan is selected as a source of drying heat by comprehensively considering the advantages, the disadvantages and the principles of the air energy heating and the fan. The air energy is heated and replaced by other heating devices, such as resistance wires which directly contact materials, so that the energy consumption is high, the heating is uneven, the heat is easy to dissipate, and if the treatment is improper, the product can be directly damaged; the microwave heating of indirect contact material, it can destroy the inner structure of heating material, has increased the loss of nutrients such as grease protein, makes the last material nutrient composition who obtains hang down to microwave heating has the radiation effect, can cause health threat to the operator to a certain extent. The electromagnetic heating has the characteristic of uniform heating, but because eddy current exists, nutrient substances of the peanuts are damaged to a certain degree. The temperature of the damaged peanut red coats is 50-55° C., so that the air can be heated to be not more than 55° C. Due to the defect of air energy devices, the maximum temperature cannot exceed 80° C., so that the peanut red coats treatment device has a good effect on peanut red coats to a certain extent. Therefore, the air energy heating of the invention patent is the optimal scheme.

The air source heat pump is provided with a heat absorbing medium, namely a refrigerant (a cold medium), and the temperature of the refrigerant in a liquid state is lower than minus 20° C., and the temperature difference exists between the refrigerant and the external natural temperature, so that the refrigerant can absorb the external natural temperature, generate pressure in an evaporator and evaporate and vaporize, the refrigerant is converted from a vapor state into a liquid state through the circulation of the heat pump, and the heat carried by the refrigerant is released to the heat pump.

The principle of the air-source heat pump is the reverse Carnot cycle. The reverse Carnot cycle is to move heat energy $Q_l$ from a low-temperature heat source to a high-temperature heat source by inputting certain power w, so that the temperature of the low-temperature heat source is lower, and the temperature of the high-temperature heat source is higher. If the range of the low-temperature heat source is infinite and the range of the high-temperature heat source is finite, the temperature of the high-temperature heat source can be greatly increased, which is the heating principle of an air source heat pump and a heating air conditioner; if the high-temperature heat source range is infinite and the low-temperature heat source range is finite, the temperature of the low-temperature heat source can be greatly reduced, and the reverse Carnot cycle comprises four processes: adiabatic expansion, isothermal expansion, adiabatic compression, isothermal compression Because the input energy W is relatively dispersed, the energy $Q_1$ (the heat energy absorbed from the low temperature) is obtained at the moment.

$$COP = \frac{Q_1}{W} = \frac{Q_1}{Q_h - Q_1} = \frac{T_1}{T_h - T_1};$$

COP theoretical values are as follows: the theoretical efficiency without considering external factors is as follows:

$$COP_0 = \frac{T_{ambient\ temperature} + 273}{\Delta t};$$

Considering various factors of actual operation of the air source heat pump, the motor efficiency is 0.95, the compressor efficiency is 0.8, the heat exchanger efficiency is 0.9, and the system efficiency is 0.8, so that the theoretical energy efficiency ratio is:

$$COP = 0.95 \times 0.8 \times 0.9 \times 0.8 \times COP_0 = 0.55 \times \left(\frac{T_{ambient\ temperature} + 273}{\Delta t}\right);$$

The air heating quantity comprises a basic heating quantity and additional heat loss, wherein the additional heat loss comprises heat loss of a hot air channel, a ventilation machine shell, a protective structure outside a wellhead room and the like. The basic heating amount is the heat amount needed by heating cold air, in the design, the general additional heat loss cannot be calculated independently, and the total heating amount can be obtained by multiplying the basic heating amount by a coefficient. Namely, the total heating amount Q is:

$$Q = \alpha M C_p (t_h - t_1),$$

wherein, M is the air intake, unit is Kg/s;
$\alpha$ is the heat loss coefficient; when the wellhead room is not closed, a=1.05~1.10; and when the wellhead room is closed, $\alpha$=1.10~1.15;
$t_h$ is air temperature after the cold air and the hot air are mixed, which can be 2° C.;
$t_1$ is the outdoor cold air temperature, unit is ° C.;
$C_p$ is the specific heat at constant air pressure, $C_p$=1.01 KJ/(Kg·K).
Air quantity passing through air heater is:

$$M_1 = a \cdot M \frac{t_h - t_l}{t_{h0} - h_l}$$

wherein,
$M_1$ is the air quantity passing through the air heater, unit is Kg/s;
$t_{h0}$ is the temperature of hot air at the outlet of the heater after heating, unit is ° C.;
the rest symbols have the same meanings as above.
The heat can be supplied by the air heater is:

$$Q' = k S \Delta t_p$$

In the formula, Q' is the heat quantity which can be supplied by the air heater, unit is KW;
K is the heat transfer coefficient of the air heater, unit is KW/(m²·K);
S is the heat dissipation area of the air heater, unit is m²;
$\Delta t_p$ is the average temperature difference between the heating medium and the air, unit is ° C.;
When the heating medium is wind:

$$\Delta t_p = t_v - (t_1 + t_{h0})/2$$

Therefore, the appropriate type selection and temperature rise time of air energy heat pump can be obtained.

The effective heating length of the conveyor belt is $\alpha$, the width is b, the heating rate is v, the mass of the heated peanuts per unit area is m, and the total heating amount of the peanuts is $m_0 = \alpha \cdot b \cdot m$.
The thermal diffusion equation is:

$$\frac{\partial}{\partial x}\left(k\frac{\partial T}{\partial x}\right) + \frac{\partial}{\partial y}\left(k\frac{\partial T}{\partial y}\right) + \frac{\partial}{\partial z}\left(k\frac{\partial T}{\partial z}\right) + q = \rho c_p \frac{\partial T}{\partial t},$$

wherein, t is time; x, y and z are coordinate axes; $\rho$ is the density; $c_p$ is the specific heat capacity at constant pressure. The thermal diffusion equation states that: at any point in the medium, the net rate of heat transfer into a unit volume plus the rate of thermal energy production per unit volume must equal the rate of change of stored energy per unit volume.
If the thermal conductivity k is a constant, the thermal diffusion equation can be expressed as follows:

$$\frac{\partial^2 T}{\partial^2 x} + \frac{\partial^2 T}{\partial^2 y} + \frac{\partial^2 T}{\partial^2 z} + \frac{q}{k} = \frac{1}{\alpha} \times \frac{\partial T}{\partial t},$$

wherein, $\alpha$ is called the thermal diffusivity, $$\alpha = \frac{k}{\rho c_p},$$

which indicates the ability of the internal temperature of the object to tend to be uniform in the process of unsteady heat conduction, that is, the greater the thermal conductivity coefficient, the faster the temperature tends to be uniform;
The heating amount is in a certain relation with the existence of the air source heat pump:

$$Q_{heat} = Q_1 + Q_k$$

Figure 14:
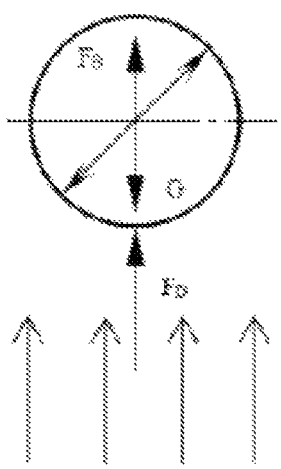
FIG. 14 is an isometric view of force analysis of red coats and peanuts of embodiment 1 of the present disclosure.

Wherein, $Q_1$ is the amount of heat consumed, $Q_k$ is the amount of heat lost.
Through the heat transfer relation, the time required for heating the materials to the interior of the red coats can be obtained.
As shown in FIG. 14, when an object is in an infinite uniform ascending flow field, the object is pushed by airflow from bottom to top, and the object itself receives gravity G and buoyancy F. If the rising flow velocity of the air flow is smaller than the sinking velocity of the object, the object will descend; if the air flow velocity is larger than the sinking velocity of the object, the object will rise. The peanut red coats are taken as a research object, and if the separation of the peanut skin from the peanut kernels is to be realized, the condition that the sum of buoyancy and lifting force in an ascending flow field is greater than the gravity of the peanut red coats and less than the gravity of the peanut kernels is required to be met, namely $$G_{red\ coat} < F_D + F_B < G_{peanut\ kernel}.$$

As shown in the figure, $F_D$ is the lifting force of the ascending flow field, and the calculation formula is:

$$F_D = \frac{1}{2} C_D \rho V_f^2 \frac{\pi}{4} d_p^2;$$

$F_B$ is buoyancy force borne by the red coats in an ascending flow field, and the calculation formula is as follows:

$$F_B = \frac{1}{6}\pi d_p^3 \rho g;$$

The red coats or peanut kernels are subjected to gravity:

$$G = mg = \frac{1}{6}\pi d_p^3 \rho_p g;$$

In the above formulas, $C_D$ is an air resistance coefficient, $\rho$ is an air density, $V_f$ is a moving speed of the object relative to the air flow, $d_p$ is a target diameter, and $\rho_p$ is a target density.

The above description is only a preferred embodiment of the present invention and is not intended to limit the present invention, and various modifications and changes may be made by those skilled in the art. Any modification, equivalent replacement, or improvement made within the spirit and principle of the present invention should be included in the protection scope of the present invention.

Although the embodiments of the present invention have been described with reference to the accompanying drawings, it is not intended to limit the scope of the invention, and it should be understood by those skilled in the art that various modifications and variations can be made without inventive changes in the technical solutions of the present invention.

What is claimed is:

1. An intelligent separation device of peanut kernel and peanut red coat, comprising:
   a gas explosion device, a stirring device, a drying device and a negative pressure adsorption device; wherein,
   the gas explosion device receives conveyed peanut materials with red coats to be removed, and materials are subjected to gas explosion under an action of pressure difference through a infiltration of supersaturated steam and a rapid pressure relief method to finish a preliminarily separation of peanut kernels and peanut red coats;
   the stirring device shifts a primarily separated peanut kernels and peanut red coats into the drying device;
   the drying device compresses outside air to raise a temperature, transfers heat through hot air, and heats and dries the primarily separated peanut kernels and peanut red coats to fully separate the peanut red coats from the peanut kernels; and
   the negative pressure adsorption device collects the fully separated peanut kernels and the red coats with different densities and qualities respectively through a negative pressure adsorption mode;
   the intelligent separation device further comprising a conveying device, wherein the conveying device comprising a feeding device, a flexible conveyor belt, and a driving device, a tail of the flexible conveyor belt being provided with a conveying slide plate, and both sides of the flexible conveyor belt being provided with a conveying baffle, and the driving device transferring material from the feeding device to the conveying slide plate through the flexible conveyor belt.

2. The intelligent separation device according to claim 1, wherein the feeding device is provided with a slide plate having a slope and a height of the flexible conveyor belt cooperating to cushion the fall of the peanuts.

3. The intelligent separation device according to claim 1, wherein the gas explosion device includes a gas explosion chamber, a steam generator port is attached to the gas explosion chamber and connected to a steam generator to generate steam, and a condensed water discharge recovery port is attached to the gas explosion chamber and connected to a subsequent air heat pump to facilitate the condensate recovery operation, and a pressure relief valve connection port is attached to the gas explosion chamber to perform a rapid pressure relief process by a pressure relief operation to cause the peanut red coats to break due to a pressure difference.

4. The intelligent separation device according to claim 3, wherein one side of the gas explosion generator chamber is equipped with a gas explosion feed sliding door and a gas explosion feed sliding rail, and the other side of the gas explosion generating chamber is equipped with a gas explosion discharge sliding door and a gas explosion discharge sliding rail; the materials slide into the gas explosion generator chamber through the cooperation of the gas explosion feed sliding door and the gas explosion feed sliding rail; after the gas explosion process in the gas explosion generator chamber is completed, the materials fall into the subsequent treatment device through the cooperation of the gas explosion discharge sliding door and the gas explosion discharge sliding rail.

5. The intelligent separation device according to claim 3, wherein a gas explosion buffer brush and a gas explosion stainless steel conveyor belt are disposed in the gas explosion chamber; the material is conveyed through the gas explosion stainless steel conveyor belt, and the peanut kernels is prevented from accumulating through the gas explosion buffer brush.

6. The intelligent separation device according to claim 1, wherein the stirring device includes a stirring feeding mechanism, a stirring vane, a stirring driving motor, and a stirring discharge mechanism; wherein,
   the material is fed by the stirring feeding mechanism, and the stirring vane is driven to rotate by the stirring driving motor, so that the material enters the next process by the stirring discharging mechanism.

7. The intelligent separation device according to claim 1, wherein the drying device includes a drying generator, one side of the drying generator is provided with a drying feeding slide rail and a drying feeding slide door for cooperation, the other side of the drying generator is provided with a drying discharge slide rail and a drying discharge slide door for cooperation, and the top of the drying generator is provided with an air energy heat source port.

8. The intelligent separation device according to claim 1, wherein the negative pressure adsorption device includes a negative pressure fan, a negative pressure pipeline, a negative pressure conveying device, a primary negative pressure collecting mechanism, a secondary negative pressure collecting mechanism, and a negative pressure storage unit; wherein,
   the material is delivered to the negative pressure adsorption device through the handover of the drying device, a drying red coat collecting tank is handed over with the primary negative pressure collecting mechanism, and an airbag on the primary negative pressure collecting mechanism is made to contract inwardly so that the pipeline is closed due to the suction effect of the negative pressure fan; the secondary collection of red coats is carried out through the secondary negative pressure collecting mechanism, and enter the material storage unit through the negative pressure pipeline.

* * * * *